(12) United States Patent
Utsumi

(10) Patent No.: US 8,063,510 B2
(45) Date of Patent: Nov. 22, 2011

(54) CHARGING CONTROL APPARATUS AND METHOD FOR CONTROLLING THE SAME

(75) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 12/479,812

(22) Filed: Jun. 7, 2009

(65) Prior Publication Data

US 2009/0309423 A1 Dec. 17, 2009

(30) Foreign Application Priority Data

Jun. 11, 2008 (JP) ................................. 2008-153102

(51) Int. Cl.
*H02J 9/00* (2006.01)
*H02J 7/04* (2006.01)
(52) U.S. Cl. .......................................... 307/64; 320/155
(58) Field of Classification Search ................... 307/64, 307/66; 320/133, 155
See application file for complete search history.

(56) References Cited

U.S. PATENT DOCUMENTS 7,851,944 B2 * 12/2010 Li et al. ........................... 307/66

FOREIGN PATENT DOCUMENTS

JP 9-56078 A 2/1997

* cited by examiner

*Primary Examiner* — Michael Rutland Wallis
(74) *Attorney, Agent, or Firm* — Canon U.S.A., Inc., IP Division

(57) ABSTRACT

A charge control apparatus operable in a first power mode or a second power mode having power consumption less than that of the first power mode, the charge control apparatus includes a main power supply, an auxiliary power supply, a charging unit, a time count unit, and a charge control unit, wherein the charge control unit controls the charging unit to switch from a first charge mode to a second charge mode upon detecting that the charging time counted by the time count unit is or larger than a predetermined time period in the first power mode, and wherein the charge control unit controls the charging unit to operate in the second charge mode when the charge control apparatus operates in the second power mode.

10 Claims, 9 Drawing Sheets

CHARGING CONTROL APPARATUS AND METHOD FOR CONTROLLING THE SAME

BACKGROUND OF THE INVENTION

1. Field of the Invention

The present invention relates to a charge control apparatus and a method for controlling the same.

2. Description of the Related Art

Conventionally, as a known technology, an auxiliary power supply (such as a secondary power supply or secondary battery) is provided to make a backup of data stored in a volatile memory such as a dynamic random access memory (DRAM) installed in an electronic device in preparation for power-down of the device.

The auxiliary power supply is charged by a main power supply of the electronic device to accumulate electric charges before the main power supply is powered down. Then, the accumulated electric charges are discharged when the device is powered down. Since the auxiliary power supply has only a limited charge capacity, it may be overcharged if the charging is continued beyond its limit (i.e., in a fully charged state). This may cause an adverse effect on lifetime of the auxiliary power supply.

An example of technologies for avoiding such an overcharge is discussed in Japanese Patent Application Laid-Open No. 9-56078. In this document, a fully-charged condition is detected by measuring a voltage of the auxiliary power supply, and an operation mode is switched to a trickle charge mode to reduce a current value for charging the auxiliary power supply.

Recently, a power-saving mode is widely employed, in which the power supplied to part of the device is cut off when no operation state lasts for a predetermined time period to save energy consumption in the device.

However, in the power-saving mode, the power supplied to a control unit (such as a central processing unit (CPU)) may be cut off. The control unit is configured to detect the fully-charged condition by measuring a voltage of the auxiliary power supply or detect whether a predetermined time period has lapsed after the charging starts. More specifically, the control unit may fail to detect the fully-charged condition or the time lapsed after the start of the charging, so that the auxiliary power supply may be continuously charged even when it is fully charged. As a consequence, the power supply becomes overcharged.

SUMMARY OF THE INVENTION

The present invention is directed to an improved charge control apparatus and a method for controlling the same.

The present invention is also directed to a charge control apparatus configured to appropriately switch a charge mode using a time count unit configured to count a charging time for an auxiliary power supply and control the charge mode to protect the auxiliary power supply from being overcharged even when a voltage for operating the time count unit is not output from a main power supply, and a method for controlling the same.

According to an aspect of the present invention, there is provided a charge control apparatus operable in a first power mode or a second power mode having power consumption less than that of the first power mode, the apparatus including: a main power supply configured to output a first output voltage and a second output voltage based on an external input voltage when the charge control apparatus operates in the first power mode, and output the first output voltage based on the input voltage when the charge control apparatus operates in the second power mode; an auxiliary power supply configured to output an auxiliary voltage in place of the first output voltage when the first output voltage is not output from the main power supply; a charging unit configured to charge the auxiliary power supply by supplying a first charge current or a second charge current having an amount of electric charges per unit time smaller than that of the first charge current based on the first output voltage from the main supply, a time count unit configured to operate based on the second output voltage to count a charging time of the auxiliary power supply by the first charge current, and a charge control unit configured to control the charging unit to operate in a first charge mode in which the auxiliary power supply is charged by the first charge current or a second charge mode in which the auxiliary power supply is charged by the second charge current, wherein the charge control unit controls the charging unit to switch from the first charge mode to the second charge mode upon detecting that the charging time counted by the time count unit is larger than a predetermined time period when the charge control apparatus operates in the first power mode, and wherein the charge control unit controls the charging unit to operate in the second charge mode when the charge control apparatus operates in the second power mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

DETAILED DESCRIPTION OF THE EMBODIMENTS

Figure 1:
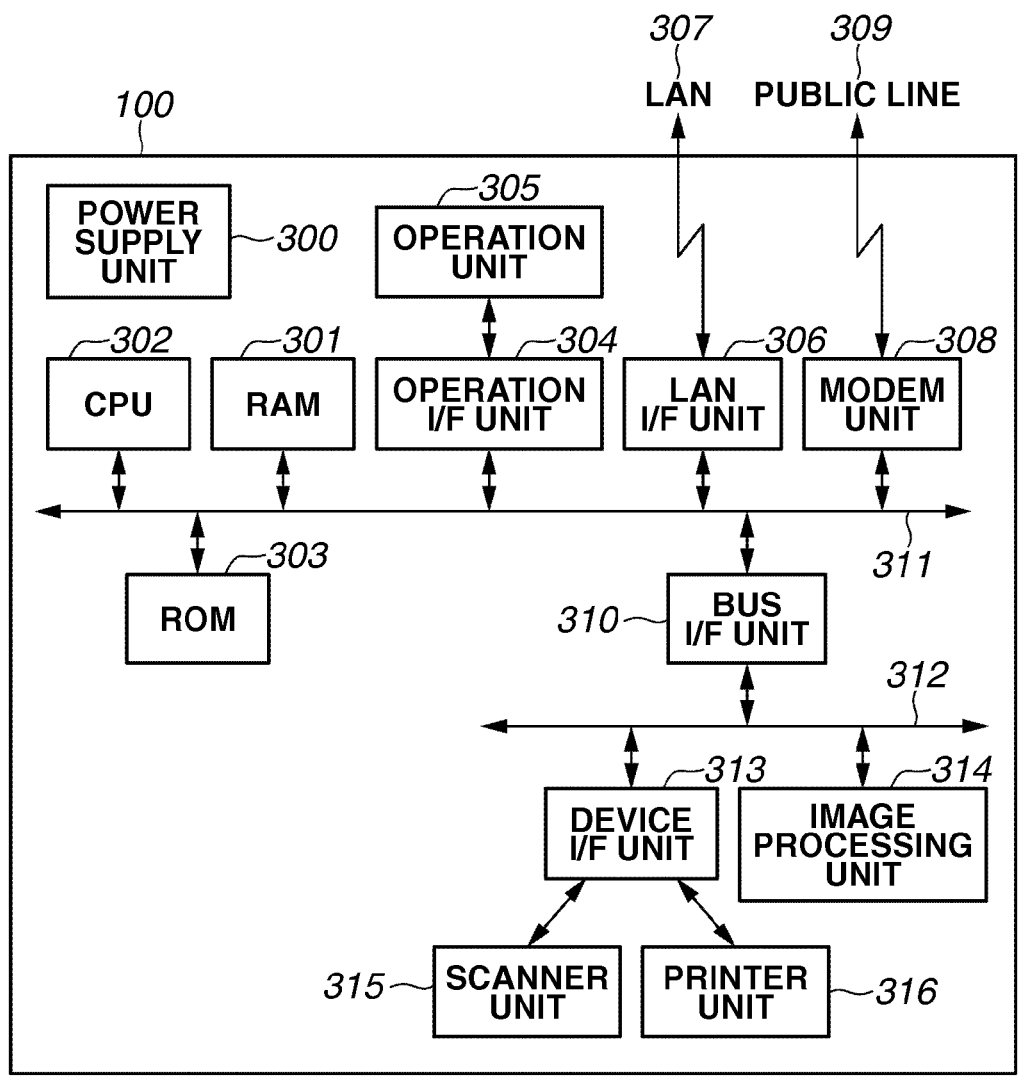
FIG. 1 is a block diagram for illustrating a hardware configuration of a printing device.

Various exemplary embodiments, features, and aspects of the invention will be described in detail below with reference to the drawings. In the drawings, elements and parts which are identical throughout the views are designated by identical reference numerals, and duplicate description thereof is omitted.

FIG. 1 is a block diagram for illustrating a hardware configuration of a printing device according to the first exemplary embodiment of the present invention.

Referring to FIG. 1, the printing device 100 includes components 300 to 316 as described below.

A CPU 302 controls each part by transmitting commands to the components 301, 304, 306, and 308 connected to a system bus 311 via the system bus 311. Also, the CPU 302 controls each part 313 and 314 connected to an image bus 312 by transmitting commands to the image bus 312 via a bus interface (I/F) unit 310.

A random access memory (RAM) 301 as a storage unit stores image data input from a scanner unit 315 or an external unit through a local area network (LAN) interface (I/F) unit 306 or a MODEM unit 308. The RAM 301, which is volatile, stores the data to be stored while receiving the voltage supplied from a power supply unit 300. The RAM 301 also functions as a work memory which temporarily stores a program to be executed by the CPU 302 or results of the program executed by the CPU 302. A read-only memory (ROM) 303 stores a boot program for booting up the printing device 100. The CPU 302 expands and executes the boot program stored in the ROM 303 in the RAM 301 to boot up the printing device 100 in response to powering up of the printing device 100. An operation I/F unit 304 transmits information, representing instructions input by an operator of the printing device 100 using the operation unit 305, to the CPU 302 via the system bus 311. The operation I/F unit 304 obtains image data to be displayed on the operation unit 305 from the ROM 303, and also transmits the image data to operation unit 305.

The LAN I/F unit 306 controls input/output operation of the image data to and from a computer terminal (external unit) connected via a LAN 307. For example, the LAN I/F unit 306 performs control to store the received image data in the RAM 301 when it receives image data from the computer terminal via the LAN 307.

The MODEM unit 308 performs control of input/output operation of facsimile data (i.e., image data) to and from a facsimile terminal (i.e., external unit) connected via a public line 309. For example, the MODEM unit 308 performs control to store the received facsimile data in the RAM 301 when it receives image data from the facsimile terminal via the public line 309.

The bus I/F unit 310 functions as a bus bridge for converting a data structure to execute data input/output operation between the system bus 311 and the image bus 312.

A device I/F unit 313 functions as an interface for transmitting the image data input from the scanner unit 315 to the image bus 312. The device I/F unit 313 functions as an interface for transmitting, to the printer unit 316, the image data transmitted from the RAM 301 to the image bus 312 via the bus I/F unit 310. The scanner unit 315 scans the image on the original as the image data using an image sensor such as a charge-coupled device (CCD). The printer unit 316 irradiates a photo-sensitive material with laser light beams corresponding to the image data to form a latent image, develops the latent image using a toner to form toner image, and then, transfers the toner image onto a paper. The printer unit 316 applies pressure and heat to the toner image transferred onto the paper using a fixing device to form a fixed image on the paper. While the exemplary embodiment has been described using an electrophotographic printer unit 316, other types including an inkjet type or the like may be employed as long as it can form an image corresponding to image data on a paper.

An image processing unit 314 executes various edition processes such as rotation or zoom-in/out of the image data. When the image data input from the scanner unit 315 is edited by the image processing unit 314, the edited image data is transmitted to the RAM 301. When the image data transmitted from the RAM 301 is edited by the image processing unit 314, the edited image data is transmitted to the printer unit 316.

A power supply unit 300 supplies power to each part of the printing device 100.

Figure 2:
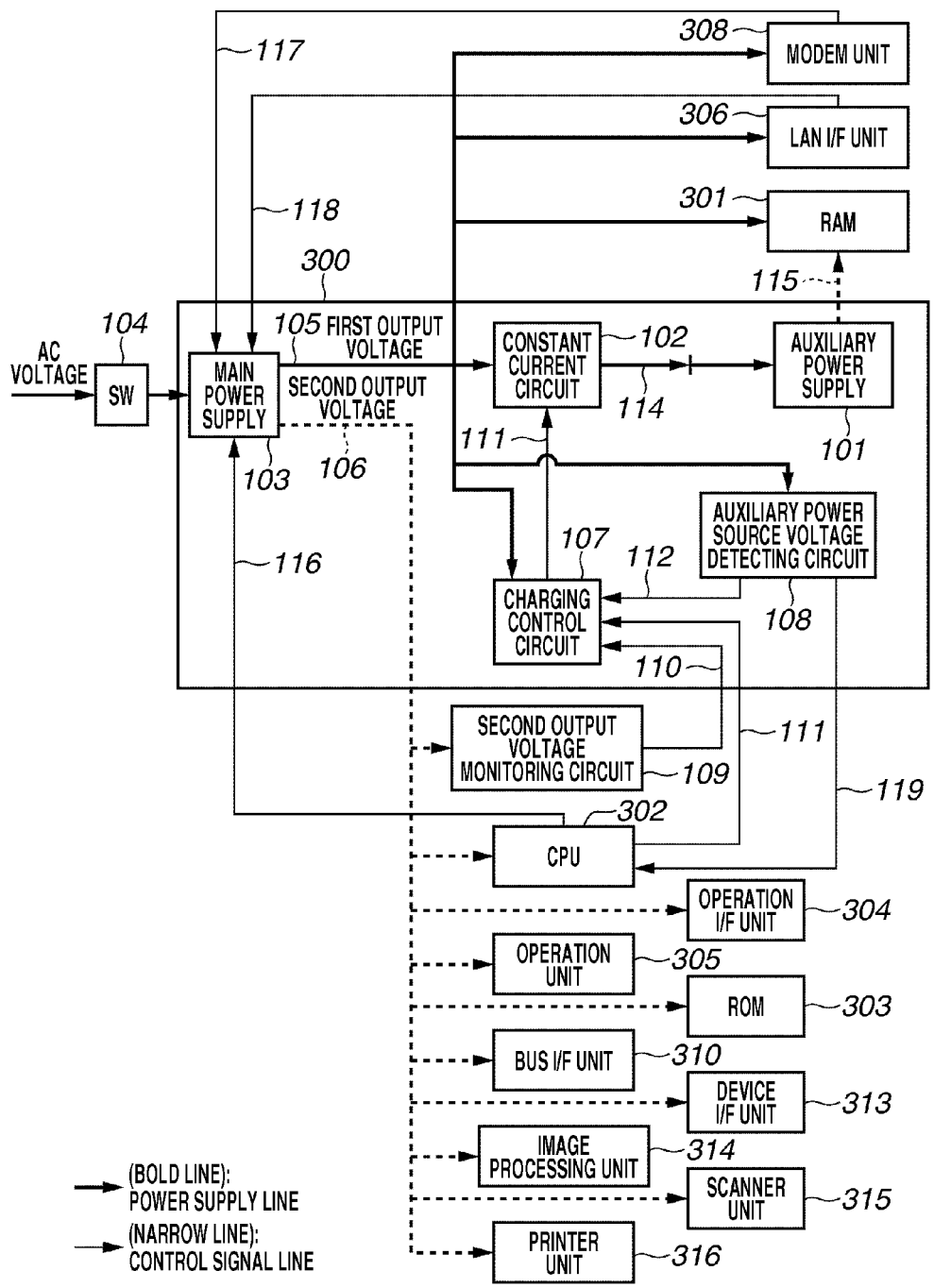
FIG. 2 is a block diagram for illustrating a hardware configuration of a power source unit.

A detailed hardware configuration of the power supply unit 300 will now be described with reference to FIG. 2. In FIG. 2, a bold line denotes a power supply line for supplying the voltages output from main and auxiliary power supply while a narrow line denotes a control signal line for delivering the control signals output from each part.

Referring to FIG. 2, the power supply unit 300 of FIG. 1 includes a main power supply 103, an auxiliary power supply 101, a constant current circuit 102, an auxiliary power supply voltage detecting circuit 108, a charge control circuit 107, and a diode 114.

The main power supply 103 receives an AC voltage supplied from a commercial power supply as an input voltage and generates a DC voltage as an output voltage in FIG. 2. A switch 104 is interposed between the commercial power supply and the main power supply 103 to allow an operator of the printing device 100 to switch between an ON-state and an OFF-state. In the ON-state, the AC voltage supplied as an input voltage from the commercial power supply is input to the main power supply 103 (i.e., an input state).

Meanwhile, in the OFF-state, the AC voltage supplied as an input voltage from the commercial power supply is not input to the main power supply (i.e., a non-input state). The main power supply 103 generates first and second output voltages and outputs them as the output voltage. As described later in association with FIG. 3, the first output voltage is always output when the switch 104 (a first switching unit) is in the ON-state.

Meanwhile, the second output voltage is selectively output depending on the signal input from the CPU 302 through the switch conversion signal line 116 even when the switch 104 is in the ON-state. Thus, the voltage output from the main power supply 103 is divided into two kinds of voltages in order to cut off the voltage supplied to part of the printing device 100 when the printing device 100 is operated in a power-saving mode (i.e., a second power mode).

According to the first exemplary embodiment, when the printing device 100 is operated in a power-saving mode, the second output voltage is not output from the main power supply 103, so that the voltage supplied to part of the components of the printing device 100 via a second output voltage supply line 106 is cut off. The part of the components of the printing device 100 may include the CPU 302, the operation I/F unit 304, the operation unit 305, the ROM 303, the bus I/F unit 310, the device I/F unit 313, the image processing unit 314, the scanner unit 315, and the printer unit 316.

Meanwhile, since the first output voltage is always output when the switch 104 is in the ON-state, part of the components to which the first output voltage is supplied can be operated even in the power-saving mode. In addition, when the printing device 100 operates in a normal power mode (i.e., a first power mode), the second output voltage is set to be output from the main power supply 103.

In other words, the printing apparatus 100 can operate in the normal power mode, or operate in the power-saving mode consuming less power than the normal power mode. In FIG. 2, the first output voltage from the main power supply 103 is supplied to the RAM 301, the LAN I/F unit 306, and the MODEM unit 308 of the printing device 100. The first output voltage is supplied to the MODEM unit 308 and the LAN I/F unit 306 because it is necessary to detect receipt of image data from an external device (e.g., a computer terminal or a facsimile terminal) when the printing device 100 operates in the power-saving mode.

Assume that the MODEM unit 308 receives image data (or a signal requiring receipt of the image data) from a computer terminal when the printing device 100 operates in a power-saving mode. In this case, a switch-on signal is output via the switch conversion signal line 117 to restart supply of the second output voltage to the CPU 302 or the like.

Assume that the LAN I/F unit 306 receives image data (or a signal requiring receipt of the image data) from a facsimile terminal when the printing device 100 operates in a power-saving mode. In this case, a switch-on signal is output via the switch conversion signal line 118 to restart supply or the second output voltage to the CPU 302 or the like. When the main power supply 103 receives the switch-on signal from the switch conversion signal line 117 or 118, the main power supply 103 switches from a state that the second output voltage is not output (i.e., a cutoff state) to a state that the second output voltage is output (i.e., an output state).

In FIG. 2, the constant current circuit 102 receives the first output voltage from the main power supply 103 via the first output voltage supply line 105. The constant current circuit 102 generates a current of a constant value while the first output voltage is supplied, and then, the generated current (i.e., a charge current) is supplied to the auxiliary power supply 101. The constant current circuit 102 supplies the current of the constant value to the auxiliary power supply 101 in a continuous charge mode (also referred to as a first charge mode) or a trickle charge mode (also referred to as a second charge mode).

Figure 3:
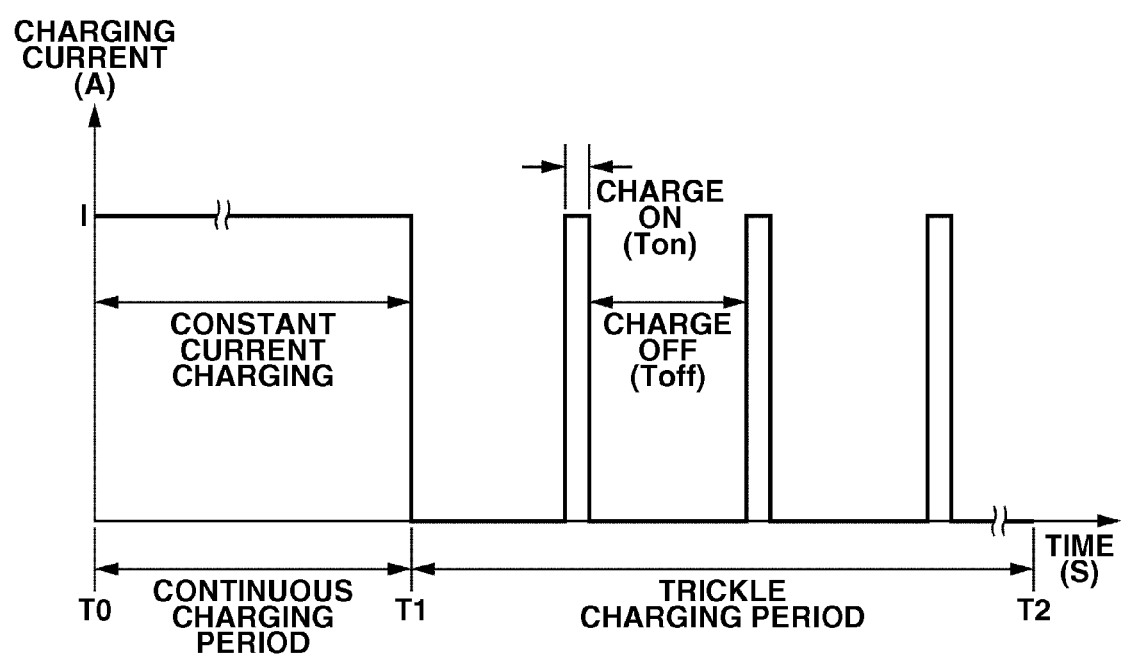
FIG. 3 illustrates a state of electric current supply in a continuous charge mode and a trickle charge mode.

During the continuous charge mode, a constant current is continuously output. For example, as illustrated in FIG. 3, a constant current value I is continuously output during a time period T0 to T1 (i.e., a continuous charge period). Meanwhile, during the trickle charge mode, a constant current value I is intermittently output. For example, as illustrated in FIG. 3, a constant current value I is intermittently output during a time period T1 to T2 (i.e., a trickle charge period). The amount of electric charges caused by the current for charging the auxiliary power supply 101 is proportional to the current value and the time of supplying the current.

Therefore, the amount of electric charges of the charge current (i.e., a second charge current) per unit time in the trickle charge mode is smaller than the amount of electric charges of the charge current (i.e., a first charge current) per unit time in the continuous charge mode. In the trickle charge mode, the amount of electric charges supplied from the constant current circuit 102 to the auxiliary power supply 101 per unit time is nearly equal to the amount of electric charges discharged by the auxiliary power supply 101 per unit time (i.e., a self-discharged electric charge amount). The amount of electric charges per unit time in the trickle charge mode is determined by a ratio between the CHARGING-ON time Ton and the CHARGING-OFF time Toff of FIG. 3. Typically, the CHARGING-ON time Ton is sufficiently smaller than the CHARGING-OFF time Toff.

The constant current circuit 102 switches between the continuous charge mode and the trickle charge mode by using the charge mode control signal received from the charge control circuit 107 via the charge mode control signal line 111. The constant current circuit 102 switches to the continuous charge mode when it receives a signal notifying of switching to the continuous charge mode (i.e., a continuous charge mode switching signal) from the charge control circuit 107. Meanwhile, the constant current circuit 102 switches to the trickle charge mode when it receives a signal notifying of switching to the trickle charge mode (i.e., a trickle charge mode switching signal) from the charge control circuit 107.

The charge control circuit 107 receives the continuous charge mode switching signal or the trickle charge mode switching signal from the auxiliary power source voltage detecting circuit 108 via the charge mode control signal line 112. The charge control circuit 107 transmits the continuous charge mode switching signal to the constant current circuit 102 when it receives the continuous charge mode switching signal from the auxiliary power source voltage detecting circuit 108. Meanwhile, the charge control circuit 107 transmits the trickle charge mode switching signal to the constant current circuit 102 when it receives the trickle charge mode switching signal from the auxiliary power source voltage detecting circuit 108.

The auxiliary power source voltage detecting circuit 108 detects a voltage value that can be supplied from the auxiliary power supply 101 to the RAM 301 in place of the first output voltage, and operates by using the first output voltage received from the main power supply 103. The auxiliary power source voltage detecting circuit 108 transmits to the charge control circuit 107 the continuous charge mode switching signal for switching from the trickle charge mode to the continuous charge mode when it is detected that the detected voltage is smaller than a predetermined threshold voltage. This operation is performed to increase the amount of electric charges stored in the auxiliary power supply 101 when the amount of electric charges stored in the auxiliary power supply 101 is reduced.

Meanwhile, the auxiliary power source voltage detecting circuit 108 transmits to the charge control circuit 107 the trickle charge mode switching signal for switching from the continuous charge mode to the trickle charge mode when it is detected that the detected voltage is larger than a predetermined threshold voltage. This operation is performed to prevent overcharge caused by the increased amount of electric charges stored in the auxiliary power supply 101 when the amount of electric charges stored in the auxiliary power supply 101 increases. Further, the threshold voltage can be desirably selected depending on the type of the auxiliary power supply. For example, if a nickel-hydrogen secondary battery is used as the auxiliary power supply, the threshold voltage can be suitably set to a fully-charged voltage of each battery (e.g., 1.3 to 1.5V if a unit cell is employed).

The charge control circuit 107 receives the trickle charge mode switching signal from the CPU 302 via the charge mode control signal line 111. The CPU 302 transmits the trickle charge mode switching signal when a predetermined time period has lapsed after the switch 104 is turned on, and then, the auxiliary power supply 101 starts to be charged by the constant current circuit 102. Thus, the constant current circuit 102 is forced to switch to the trickle charring mode when a predetermined time period has lapsed after the charging starts. This operation is performed to prevent the auxiliary power supply 101 from being overcharged when the voltage output from the auxiliary power supply 101 is reduced due to deterioration of the auxiliary power supply 101. The constant current circuit 102 can switch to the trickle charge mode by forcing the CPU 302 to switch to the trickle charge mode even when the auxiliary power source voltage detecting circuit 108 does not transmit the trickle charge mode switching signal.

The charge control circuit 107 receives the trickle charge mode switching signal from the second output voltage monitoring circuit 109 via the charge mode control signal line 110. The second output voltage monitoring circuit 109 transmits the trickle charge mode switching signal when the second output voltage is not output from the main power supply 103. The second output voltage monitoring circuit 109 operates when the second output voltage is received from the main power supply 103. When the supplied second output voltage is smaller than a predetermined threshold voltage, the trickle charge mode switching signal is output to the charge control circuit 107 via the charge mode control signal line 110. Also, the second output voltage is not output when the CPU 302 determines that the printing device 100 should switch to a power-saving mode and transmits a power-saving mode switching signal to the main power supply 103 via a power-saving mode switching signal line 116. In other words, the second output voltage monitoring circuit 109 is used to force the constant current circuit 102 to switch to the trickle charge mode when the printing device 100 operates in the power-saving mode.

When the switch 104 is turned off or the AC voltage is not input to the switch 104 (i.e., a power stoppage state), the auxiliary power supply 101 performs the following operation. An auxiliary voltage is supplied via an auxiliary voltage supply line 115 in place of the first output voltage to back up the data stored in the RAM 301. The RAM 301 operates in a self-refresh mode to store the data during the auxiliary voltage is supplied. If the printing device 100 is returned from the power-saving state to the normal state (i.e., the second output voltage is output) while the auxiliary voltage has been sufficiently supplied by the auxiliary power supply, the CPU 302 can operate using the data stored in the RAM 301. Furthermore, a diode 114 may function as a rectification element to prevent the current from flowing backward from the auxiliary power supply 101 to the constant current circuit 102 due to the auxiliary voltage when the switch 104 is turned off.

Figure 4:
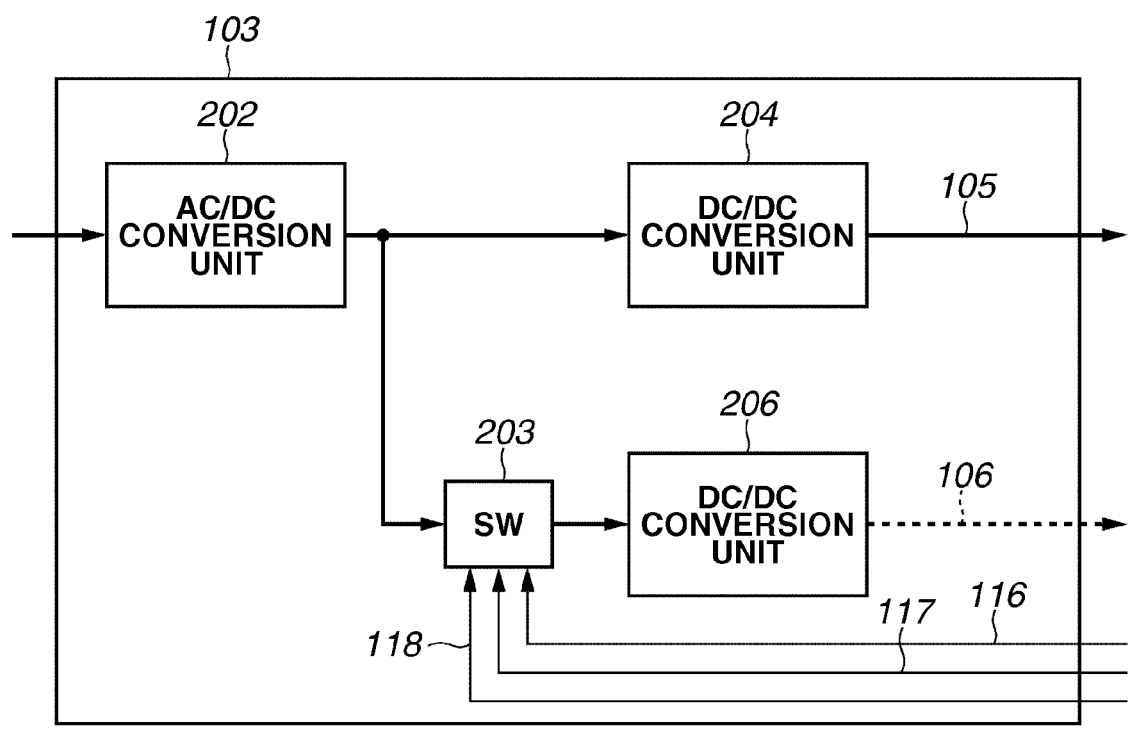
FIG. 4 illustrates a hardware configuration of components of a main power supply.

An internal configuration of the main power supply 103 will now be described with reference to FIG. 4. FIG. 4 illustrates a hardware configuration including internal components of the main power supply 103.

An alternating current/direct current (AC/DC) conversion unit 202 of the main power supply 103 converts the AC voltage inputted when the switch 104 is turned on, into the DC voltage, and outputs the converted DC voltage to a DC/DC conversion unit 204 and the DC/DC conversion unit 206. A switch 203 (also referred to as a second switching unit) is interposed between the DC/DC conversion unit 206 and the AC/DC conversion unit 202, and placed in an ON-state or an OFF-state. When the switch 203 is in the ON-state, the DC voltage output from the AC/DC conversion unit 202 is input to the DC/DC conversion unit 206. Meanwhile, when the switch 203 is in the OFF-state, the DC voltage output from the AC/DC conversion unit 202 is not input to the DC/DC conversion unit 206. The switch 203 is turned off (from the ON-state to the OFF-state) when the power-saving mode switching signal is input via the power-saving mode switching signal line 116. When a switch-on signal is input via the switch conversion signal line 117 or 118, the switch is turned on from OFF-state to the ON-state.

Operation of charging the auxiliary power supply 101 using the constant current circuit 102 of the printing device 100 will now be described with reference to FIGS. 5 to 7.

The constant current circuit 102 switches to the charge mode in response to the charge mode control signal received from the charge control circuit 107 via the charge mode control signal line 111. The charge control circuit 107 determines which charge mode control signal is to be transmitted to the constant current circuit 102 based on the charge mode control signals received from the auxiliary power source voltage detecting circuit 108, the CPU 302, and the second output voltage monitoring circuit 109. The charge control circuit 107 may receive the charge mode control signal from the auxiliary power source voltage detecting circuit 108, the CPU 302, or the second output voltage monitoring circuit 109. Each case will now be separately described.

Figure 5:
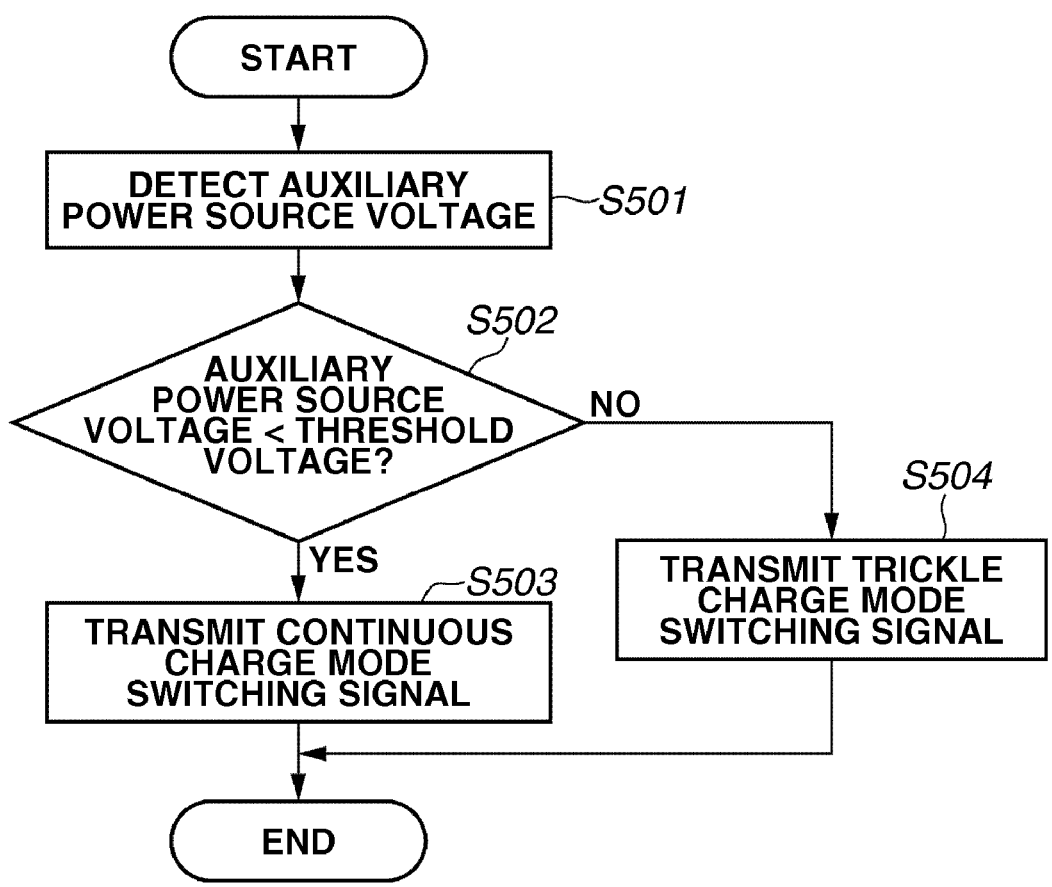
FIG. 5 is a flowchart illustrating processing for transmitting a charge mode control signal to a charge control circuit by an auxiliary power source voltage detection circuit.

FIG. 5 is a flowchart illustrating operation of transmitting the charge mode control signal to the charge control circuit 107 by the auxiliary power source voltage detecting circuit 108. The auxiliary power source voltage detecting circuit 108 executes the operation illustrated in FIG. 5 while receiving the first output voltage from the main power supply 103 via the first output voltage supply line 105.

In step S501, the auxiliary power source voltage detecting circuit 108 detects a voltage value that can be supplied from the auxiliary power supply 101 to the RAM 301. In step S502, the auxiliary power source voltage detecting circuit 108 determines whether the voltage value detected in step S501 is smaller than a predetermined threshold voltage. If it is determined that the detected voltage value is smaller than the predetermined threshold voltage (YES in step S502), the process advances to step S503. If it is determined that the detected voltage value is not smaller than the predetermined threshold voltage (NO in step S502), the process advances to step S504.

In step S503, since it is necessary to increase the amount of electric charges stored in the auxiliary power supply 101, the auxiliary power source voltage detecting circuit 108 transmits the continuous charge mode switching signal to the charge control circuit 107 to operate the constant current circuit 102 in the continuous charge mode.

Meanwhile, in step S504, the auxiliary power source voltage detecting circuit 108 transmits the trickle charge mode switching signal to the charge control circuit 107 to operate the constant current circuit 102 in the trickle charge mode to prevent the auxiliary power supply 101 from being overcharged.

While, in the above description, the continuous charge mode switching signal is transmitted in step S503, the continuous charge mode switching signal may not be transmitted each time the flowchart of FIG. 5 is executed, but other methods may be employed. For example, the continuous charge mode switching signal may not be transmitted if it has been already transmitted in the previous flowchart operation try. According to this method, the continuous charge mode switching signal is not transmitted each time it is determined YES in step S502 as a result of the flowchart of FIG. 5.

Also, while the trickle charge mode switching signal is transmitted in step S504 in the above description, the trickle charge mode switching signal may not be transmitted each time the flowchart of FIG. 5 is executed, and other methods may be employed. For example, the trickle charge mode switching signal may not be transmitted if it is has been already transmitted in the previous flowchart operation try. According to this method, the trickle charge mode switching signal is not transmitted each time it is determined NO in step S502 as a result of the flowchart of FIG. 5.

Operation of transmitting the charge mode control signal to the charge control circuit 107 by the CPU 302 will now be described with reference to FIG. 6.

Figure 6:
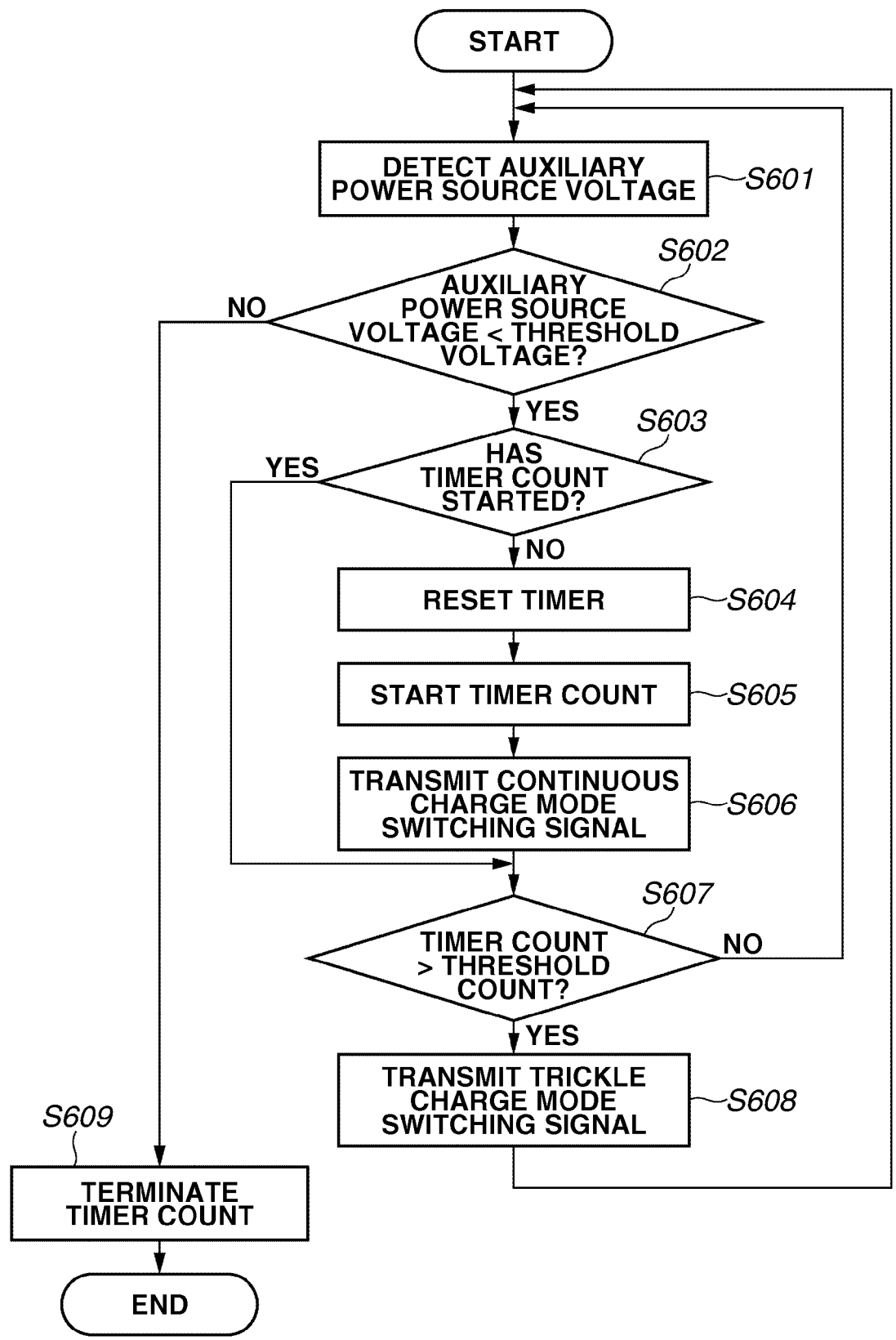
FIG. 6 is a flowchart illustrating processing for transmitting a charge mode control signal to a charge control circuit by a central processing unit (CPU).
Figure 7:
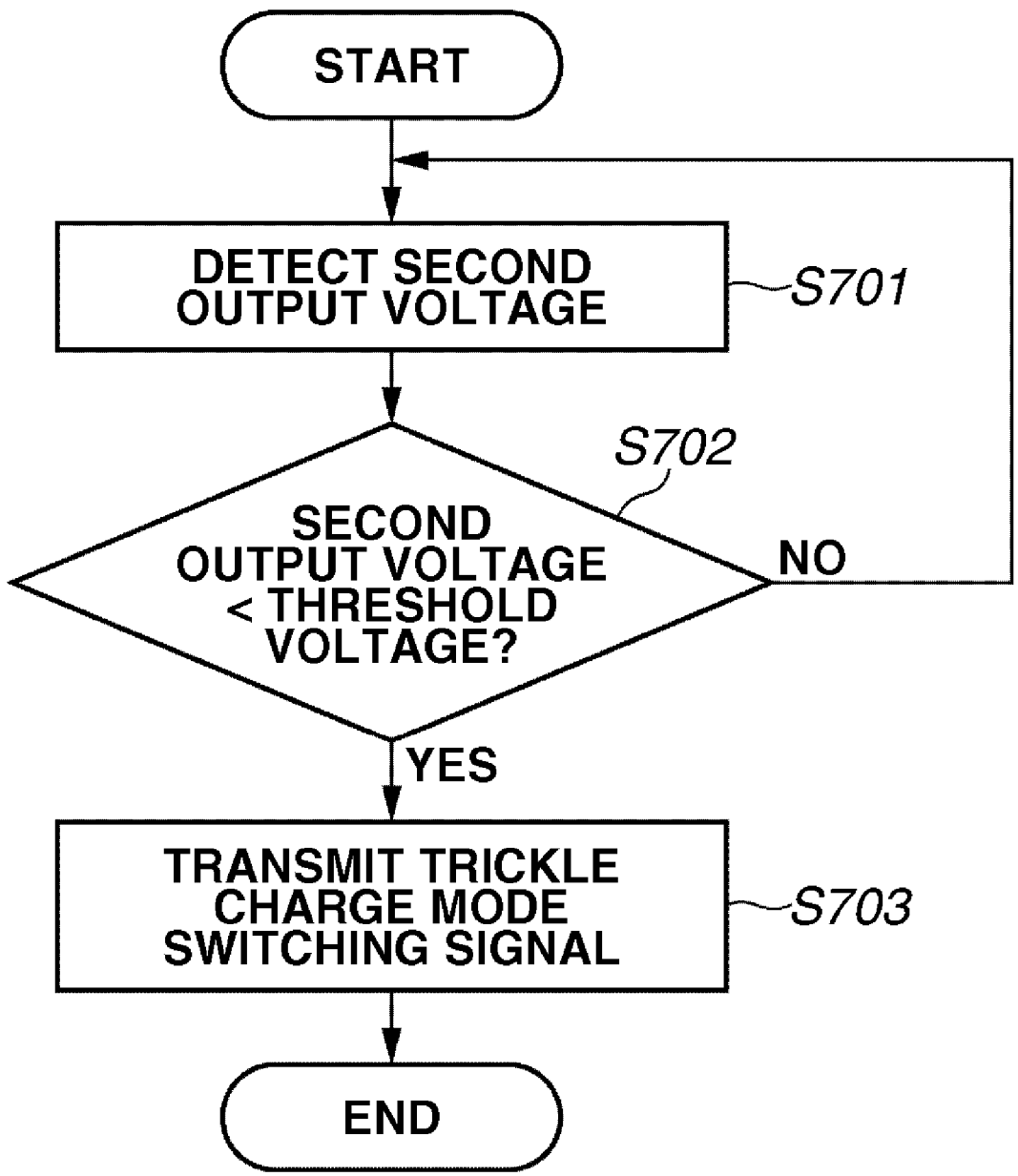
FIG. 7 is a flowchart illustrating processing for transmitting a charge mode control signal to a charge control circuit by a second output voltage monitoring circuit.

The CPU 302 executes the operation of FIG. 6 while the second output voltage is supplied from the main power supply 103 via the second output voltage supply line 106.

In step S601, the CPU 302 detects a voltage value that the auxiliary power supply 101 can supply to the RAM 301. While this voltage value is detected by the auxiliary power source voltage detecting circuit 108 in practice, it is assumed that this voltage value can also be determined by the CPU 302 based on information received via the signal line 119.

In step S602, the CPU 302 determines whether the voltage value detected in step S601 is smaller than a predetermined threshold voltage. If it is determined that the detected voltage value is smaller than the predetermined threshold voltage (YES in step S602), the process advances to step S603. Otherwise, if it is determined that the detected voltage value is not smaller than the predetermined threshold voltage (NO in step S602), the process advances to step S609.

In step S603, the CPU 302 determines whether the timer of the CPU 302 has started a counting process (i.e., a timer count). If it is determined that the timer has started the counting process (YES in step S603), the process advances to step S607. Otherwise, if it is determined that the time has not started the counting process (NO in step S603), the process advances to step S604.

In step S604, the CPU 302 resets the count value of the timer. In step S605, the CPU 302 starts a count process using the timer. Further, since the auxiliary power source voltage is smaller than the predetermined threshold voltage in step S605, the CPU 302 needs to increase the amount of electric charges stored in the auxiliary power supply 101. In step S606, the continuous charge mode switching signal is transmitted to the charge control circuit 107 to operate the constant current circuit 102 in the continuous charge mode.

In step S607, the CPU 302 determines whether the counted value of the timer that has started in step S605 is larger than a threshold count value (i.e., a predetermined time period). If it is determined that the counted value is larger than the threshold count value (YES in step S607), the process advances to step S608. If it is determined that the counted value is not larger than the threshold count value (NO in step S607), the process returns to step S601. In this case, the threshold count value is used to prevent the auxiliary power supply 101 from being overcharged when the voltage value output from the auxiliary power supply 101 is reduced due to deterioration of the auxiliary power supply 101, and the constant current circuit 102 operates in the continuous charge mode for a long time. The threshold count value (i.e. a predetermined time period) can be determined based on the type or the capacity of the auxiliary power supply to be charged. For example, if a charge current of 250 mA flows to the auxiliary power supply having a capacity of 500 mAh in the continuous charge mode, the threshold count value can be set to 2 to 3 hours.

In step S608, the CPU 302 transmits the trickle charge mode switching signal to the charge control circuit 107 to operate the constant circuit 102 in the trickle charge mode to prevent the auxiliary power supply 101 from being overcharged. When the charge control circuit 107 receives the trickle charge mode switching signal from the CPU 302, it transmits the trickle charge mode switching signal to the constant current circuit 102. The constant current circuit 102 switches to the trickle charge mode upon receiving the trickle charge mode switching signal (as a first control process)

In step S609, since the output voltage value of the auxiliary power supply 101 is larger than the threshold voltage, the CPU 302 terminates the count process of the timer that has started in step S605, and also terminates the operation of FIG. 6.

According to the operation of FIG. 6, the CPU 302 forces the constant current circuit 102 to switch to the trickle charge mode in step S608. This allows the constant current circuit 102 to switch to the trickle charge mode even when the auxiliary power source voltage detecting circuit 108 does not transmit the trickle charge mode switching signal.

Operation of transmitting the charge mode control signal to the charge control circuit 107 by the second output voltage monitoring circuit 109 will now be described with reference to FIG. 7. The second output voltage monitoring circuit 109 executes the operation of FIG. 7 while it receives the second output voltage from the main power supply 103 via the second output voltage supply line 106.

In step S701, the second output voltage monitoring circuit 109 detects the voltage value of the second output voltage input via the second output voltage supply line 106. In step S702, it is determined whether the voltage value detected in step S701 is smaller than a predetermined threshold voltage. If it is determined that the detected voltage value is smaller than the predetermined threshold voltage (YES in step S702), the process advances to step S703. If it is determined that the detected voltage value is not smaller than the predetermined threshold voltage (NO in step S702), the process returns to step S701.

In step S703, since the second output voltage is smaller than the predetermined threshold voltage, the second output voltage monitoring circuit 109 transmits the trickle charge mode switching signal to the charge control circuit 107 to operate the constant current circuit 102 in the trickle charge mode. The charge control circuit 107 transmits the trickle charge mode switching signal to the constant current circuit 102 when it receives the trickle charge mode switching signal from the second output voltage monitoring circuit 109. The constant current circuit 102 switches to the trickle charge mode upon receiving the trickle charge mode switching signal (as a second control process). The second output voltage is not output when the CPU 302 determines that the printing device 100 should switch to a power-saving mode, and the power-saving mode switching signal is transmitted to the main power supply 103 via the power-saving mode switching signal line 116.

As described above, according to the first exemplary embodiment, the printing device 100 can execute various kinds of operation to prevent the auxiliary power supply 101 from being overcharged.

First, the auxiliary power source voltage detecting circuit 108 can transmit the trickle charge mode switching signal to the charge control circuit 107 when the voltage output from the auxiliary power supply 101 is larger than a predetermined threshold voltage.

Second, the CPU 302 can transmit the trickle charge mode switching signal to the charge control circuit 107 in a given case even when the auxiliary power source voltage detecting circuit 108 does not transmit the trickle charge mode switching signal. Namely, the CPU 302 can transmit the trickle charge mode switching signal in the case where the charging has started in the continuous charge mode, and then, a predetermined time period has lapsed while the voltage output from the auxiliary power supply 101 is smaller than a predetermined threshold voltage.

Third, the second output voltage monitoring circuit 109 can transmit the trickle charge mode switching signal to the charge control circuit 107 in a given case even when the auxiliary power source voltage detecting circuit 108 or the CPU 302 does not transmit the trickle charge mode switching signal. Namely, the second output voltage monitoring circuit 109 can transmit the trickle charge mode switching signal in the case where the printing device 100 operates in a power-saving mode.

As described above, the charge mode can switch from the continuous charge mode to the trickle charge mode using the timer count process of the CPU 302, in which the time lapsed after start of the charging of the auxiliary power supply 101 is counted. Further, the charge mode can appropriately switch from the continuous charge mode to the trickle charge mode to prevent the auxiliary power supply 101 from being overcharged even when the second output voltage for operating the CPU 302 (and its timer) is not output from the main power supply 103.

The second exemplary embodiment of the present invention will now be described with reference to the drawings. The configuration as well as the hardware of the printing device 100 described in association with the first exemplary embodiment are similarly employed in the second exemplary embodiment unless specified otherwise.

In the first exemplary embodiment, the auxiliary power supply 101 is charged by operating the constant current circuit 102 in one of the continuous charge mode or the trickle charge mode as illustrated in FIG. 3. A waveform of the electric current in the trickle charge mode is illustrated in the time period T1 to T2 of FIG. 3.

According to the second exemplary embodiment, the waveform of the electric current in the trickle charge mode is changed depending on a trigger which causes shift to the trickle charge mode, unlike the first exemplary embodiment.

In the first exemplary embodiment, the constant current circuit 102 changes its charge mode in response to the trickle charge mode switching signal or the continuous charge mode switching signal received from the charge control circuit 107. Transmission of a signal from the charge control circuit 107 to the constant current circuit 102 is triggered when one of the following three patterns occurs:

(1) when the auxiliary power source voltage detecting circuit 108 transmits the trickle charge mode switching signal or the continuous charge mode switching signal to the charge control circuit 107;

(2) when the CPU 302 transmits the trickle charge mode switching signal to the charge control circuit 107; or (3) when the second output voltage monitoring circuit 109 transmits the trickle charge mode switching signal to the charge control circuit 107.

Since the pattern (3) is executed when the printing device 100 is to be switched to a power-saving mode, the electric charges accumulated in the auxiliary power supply 101 may not be sufficient (the charging may not have been completed yet).

For this reason, according to the second exemplary embodiment, the amount of electric charges charged per unit time is set to be larger in the pattern (3) in comparison with the pattern (1) or (2) when the constant charge circuit 102 operates in the trickle charge mode.

Figure 8:
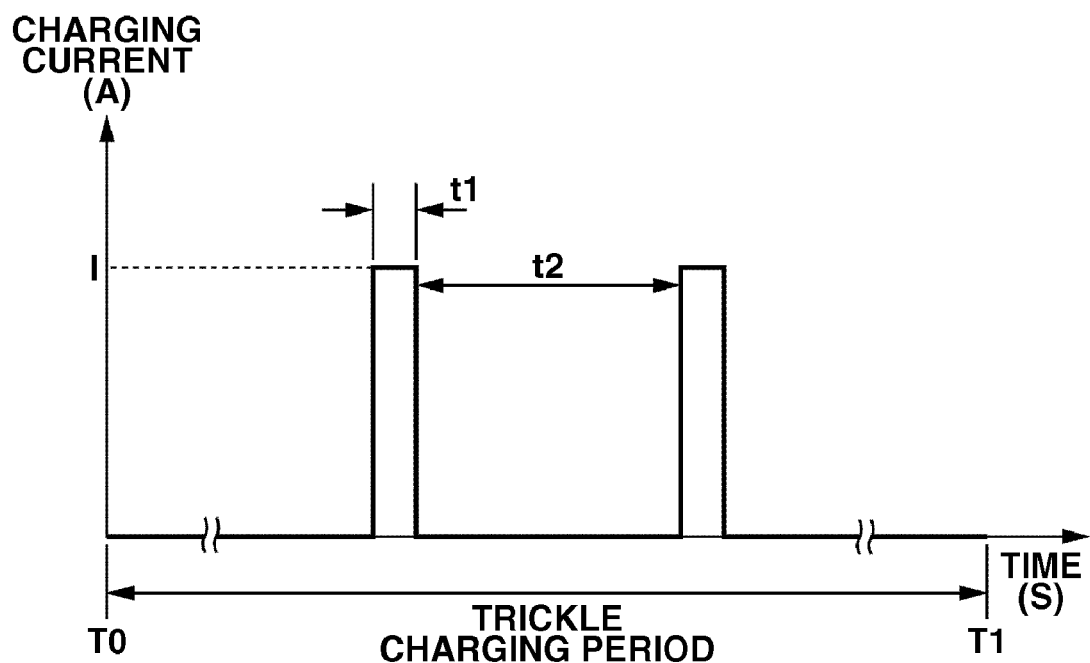
FIG. 8 illustrates a waveform of the electric current output from a constant current circuit in the trickle charge mode.
Figure 9:
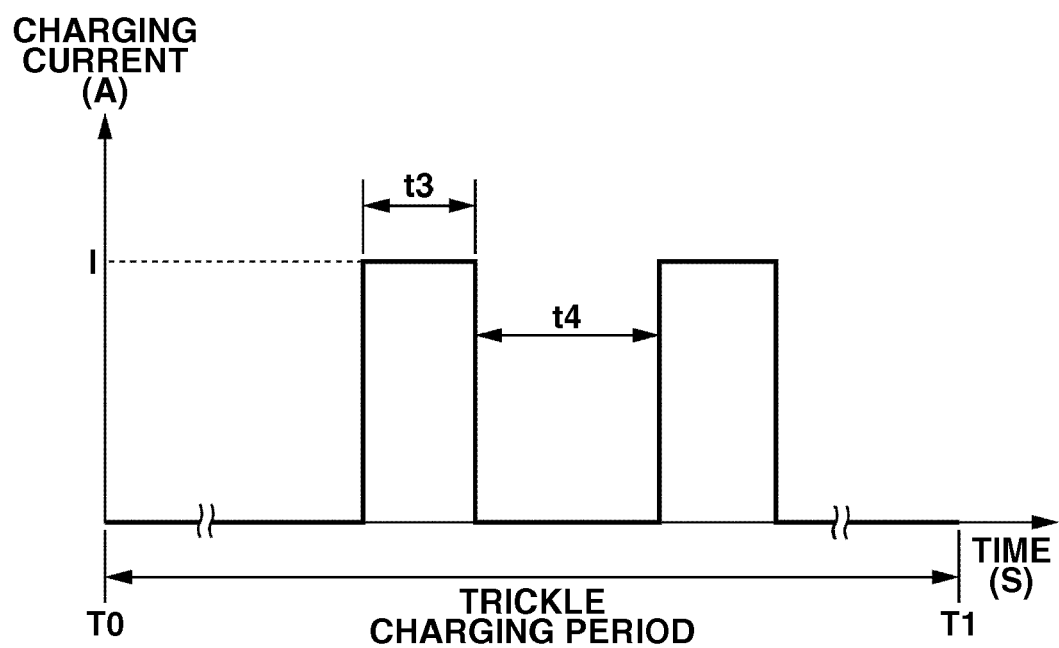
FIG. 9 illustrates a waveform of the electric current output from a constant current circuit in a trickle charge mode.

More specifically, when the constant current circuit 102 switches to the trickle charge mode in the patterns (1) and (2), a waveform of the electric current illustrated in FIG. 8 is output from the constant current circuit 102. Meanwhile, when the constant current circuit 102 switches to the trickle charge mode in the pattern (3), the waveform of the electric current illustrated in FIG. 9 is output from the constant current circuit 102.

More specifically, the charge control circuit 107 controls the constant current circuit 102 to output a waveform of the electric current as illustrated in FIG. 8, when it receives the trickle charge mode switching signal via the charge mode control signal line 111 or 112. Meanwhile, the charge control circuit 107 controls the constant current circuit 102 to output a waveform of the electric current illustrated in FIG. 9 when it receives the trickle charge mode switching signal via the charge mode control signal 110.

In addition, when the constant current circuit 102 switches to the trickle charge mode in the pattern (3), the second output voltage is not output from the main power supply 103 but cut off since the printing device 100 operates in the power-saving mode. When the constant current circuit 102 operates in the trickle charge mode, the amount of electric charges charged per unit time using the waveform of the electric current illustrated in FIG. 9 is larger than that using the waveform illustrated in FIG. 8. For example, assuming that a constant current I is output for a time period t1 in FIG. 8, and a constant current I is output for a time period t3 in FIG. 9, the time period t3 is longer than the time period t1. Similarly, assuming that a constant current I is not output for a time period t2 in FIG. 8, and the constant current I is not output for a time period t4 in FIG. 9, the time period t4 is shorter than the time period t2. Therefore, the amount of electric charges output from the constant current circuit 102 to the auxiliary power supply 101 per unit time using the waveform of the electric current illustrated in FIG. 9 is larger in comparison with the waveform illustrated in FIG. 8.

It is desirable that the amount of electric charges per unit time output using the waveform illustrated in FIG. 8 is set to be substantially equal to the amount of electric charges output per unit time when the auxiliary power supply 101 is self-discharged. This is because the auxiliary power supply 101 may store a sufficient amount of electric charges, and thus, it may be impossible to store any more electric charge when the waveform illustrated in FIG. 8 is output. In this state, if the amount of electric charges that is larger than that output per unit time when the auxiliary power supply 101 is self-discharged, is received from the constant current circuit 102, the auxiliary power supply 101 may be possibly overcharged.

Furthermore, it is desirable that the amount of electric charges outputted per unit time using the waveform illustrated in FIG. 9 is set to be larger than the amount of electric charges outputted per unit time when the auxiliary power supply 101 is self-discharged. This is because the auxiliary power supply 101 may not possibly store a sufficient amount of electric charges when the waveform illustrated in FIG. 9 is output. In this state, even if the amount of electric charges outputted per unit time that is larger than that outputted when the auxiliary power supply 101 is self-discharged, is received from the constant current circuit 102, it is not likely that the auxiliary power supply 101 is overcharged. Even when the auxiliary power supply 101 is overcharged, the amount of electric charges supplied per unit time to the auxiliary power supply 101 according to the second exemplary embodiment is sufficiently smaller in comparison with that in the continuous charge mode according the first exemplary embodiment. Therefore, the lifetime of the auxiliary power supply 101 is not significantly affected.

The present invention may also be accomplished by supplying a system or an apparatus with a storage medium in which a program code of software, which realizes the functions of the aforementioned exemplary embodiments is stored, and causing a computer (or CPU or MPU) of the system or apparatus to read out and execute the program code stored in the storage medium. In this case, the program code itself read from the storage medium realizes the functions of the exemplary embodiments, and therefore, the program code and the storage medium in which the program code is stored constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-153102 filed Jun. 11, 2008, which is hereby incorporated by reference herein in its entirety.

What is claimed is:

1. A charge control apparatus operable in a first power mode or a second power mode having power consumption less than that of the first power mode, the apparatus comprising:
  a main power supply configured to output a first output voltage and a second output voltage based on an external input voltage when the charge control apparatus operates in the first power mode, and output the first output voltage based on the input voltage when the charge control apparatus operates in the second power mode;
  an auxiliary power supply configured to output an auxiliary voltage in place of the first output voltage when the first output voltage is not output from the main power supply;
  a charging unit configured to charge the auxiliary power supply by supplying a first charge current or a second charge current having an amount of electric charges per unit time smaller than that of the first charge current based on the first output voltage from the main supply;
  a time count unit configured to operate based on the second output voltage to count a charging time of the auxiliary power supply by the first charge current; and
  a charge control unit configured to control the charging unit to operate in a first charge mode in which the auxiliary power supply is charged by the first charge current or a second charge mode in which the auxiliary power supply is charged by the second charge current,
  wherein the charge control unit controls the charging unit to switch from the first charge mode to the second charge mode upon detecting that the charging time counted by the time count unit is larger than a predetermined time period when the charge control apparatus operates in the first power mode, and wherein the charge control unit controls the charging unit to operate in the second charge mode when the charge control apparatus operates in the second power mode.

2. The charge control apparatus according to claim 1, further comprising a detecting unit configured to detect a voltage value of the auxiliary voltage output from the auxiliary power supply, wherein the charge control unit controls the charging unit to switch from the second charge mode to the first charge mode upon detecting that the voltage value of the auxiliary voltage detected by the detecting unit is smaller than a predetermined threshold voltage when the charge control apparatus operates in the first power mode.

3. The charge control apparatus according to claim 2, wherein the charge control unit controls the charging unit to switch from the first charge mode to the second charge mode if a voltage value of the auxiliary voltage detected by the detecting unit is larger than the predetermined threshold voltage even if the time counted by the time count unit is smaller than the predetermined time period when the charge control apparatus operates in the first power mode.

4. The charge control apparatus according to claim 1, further comprising a storage unit configured to store data by receiving a voltage, wherein the first output voltage from the main power supply is output to the storage unit, and the auxiliary voltage from the auxiliary power supply is output to the storage unit in place of the first output voltage.

5. The charge control apparatus according to claim 1, wherein the charging unit continuously outputs a constant current value in the first charge mode, and intermittently outputs a constant current value in the second charge mode.

6. The charge control apparatus according to claim 1, further comprising a first switching unit configured to switch between an input state in which the external input voltage is input to the main power supply and a non-input state in which the external input voltage is not input to the main power supply, wherein the second output voltage is output from the main power supply in the input state set by the first switching unit, and the second output voltage is not output from the main power supply in the non-input state set by the first switching unit.

7. The charge control apparatus according to claim 6, further comprising a second switching unit configured to switch between an output state in which the second output voltage is output from the main power supply and a cutoff state in which the second output voltage is not output from the main power supply, when in the input state set by the first switching unit.

8. The charge control apparatus according to claim 7, wherein the amount of electric charges of the second charge current supplied by the charging unit per unit time is larger in the cutoff state set by the second switching unit in comparison with the output state set by the second switching unit, when the charging unit operates in the second charge mode.

9. The charge control apparatus according to claim 1, wherein the charging time is time counted from when the auxiliary voltage starts to be charged by the first charge current.

10. A method for controlling a charge control apparatus operable in a first power mode or a second power mode having power consumption less than that of the first power mode, the apparatus comprising: a main power supply configured to output a first output voltage and a second output voltage based on an external input voltage when the charge control apparatus operates in the first power mode, and output the first output voltage based on the input voltage when the charge control apparatus operates in the second power mode; an auxiliary power supply configured to output an auxiliary voltage in place of the first output voltage when the first output voltage is not output from the main power supply; and a charging unit configured to charge the auxiliary power supply by supplying a first charge current or a second charge current having an amount of electric charges per unit time smaller than that of the first charge current based on the first output voltage from the main supply,
  the method comprising:
    counting a charging time for charging the auxiliary power supply with the first charge current using a time count unit which operates based on the second output voltage output from the main power supply;
    controlling the charging unit to switch from a first charge mode in which the auxiliary power supply is charged by the first charge current to a second charge mode in which the auxiliary power supply is charged by the second charge current upon detecting that the counted charging time is larger than a predetermined time period, when the charge control apparatus operates in the first power mode; and
    controlling the charging unit to operate in the second charge mode when the charge control apparatus operates in the second power mode.

* * * * *